Jan. 16, 1945. W. D. ANDERSON 2,367,554
RESILIENT BALL SEPARATOR
Filed July 31, 1942 2 Sheets—Sheet 1

INVENTOR: WARREN D. ANDERSON
BY: C. P. Goepel
ATTORNEY

Jan. 16, 1945.   W. D. ANDERSON   2,367,554
RESILIENT BALL SEPARATOR
Filed July 31, 1942   2 Sheets-Sheet 2

INVENTOR: WARREN D. ANDERSON
BY: C. P. Goepel
ATTORNEY

Patented Jan. 16, 1945

2,367,554

UNITED STATES PATENT OFFICE 2,367,554

RESILIENT BALL SEPARATOR

Warren D. Anderson, Stamford, Conn., assignor to Norma-Hoffmann Bearings Corporation, Stamford, Conn., a corporation of New York Application July 31, 1942, Serial No. 453,011

1 Claim. (Cl. 308—199)

This invention relates to ball bearings, and particularly to a resilient ball separator or spacer adapted to be placed between adjacent circumferentially spaced balls riding between outer and inner races.

The object of the invention is to provide a resilient ball separator or spacer, which is so constituted as to result in a bearing having a very low frictional torque, particularly at low speeds.

A further object of this invention is to provide such a resilient ball separator or spacer which will effectively maintain a desired separation of the balls and yet be free of certain difficulties which may occur in known types of separators.

There are many applications in scientific instruments and devices wherein the ball bearings are very lightly loaded and only a small amount of energy is available to actuate the instrument and in which any sticking or binding action resulting from the use of a relatively rigid retainer to space the balls is extremely objectionable. In such applications it has been found that the binding action arising from the forces exerted upon the balls by the retainer is much larger than the rolling friction between the raceways and balls. It is in applications of this nature that a resilient separator in distinction to a relatively rigid retainer is desirable.

In striving to obtain the utmost freedom of action in a bearing incorporating resilient separators in the form of a helical spring, certain peculiar problems arise. Among these is a tendency for the spring to rotate around an axis perpendicular to the axis of the spring, and also with springs of very small diameter wire, a wedging of the end coil in the bight of the ball and inner racering may occur, and interferes with the freedom of rotation of the bearing.

It has been found that when such a resilient separator has end portions which partially conform to the surface of the adjacent balls thereby forming seats or pockets for the balls, and which seats or pockets have a seating diameter substantially smaller than the outside diameter of the spring, then the end coil of the spring will not approach the junction between the ball surface and the inner raceway surface so as to bring about a wedging action and the spring itself will maintain its desired position in the space between the balls and raceways.

This improved helical spring separator is positioned in radial direction by portions of the spring which are only slightly less than the ball diameter and is positioned in an axial direction by end portions of the springs having seating diameters substantially smaller than the outside diameter of the spring, the end portions at least partially conforming to the adjacent ball surfaces. This invention may be embodied in various structural forms, the features of which will be shown and described hereinafter.

The invention will be further described in the light of various embodiments shown in the drawings and will be finally pointed out in the claim.

In the accompanying drawings.

Similar characters of reference indicate corresponding parts throughout the various views.

Figures 1, 2, 3, 4, 5, 6:
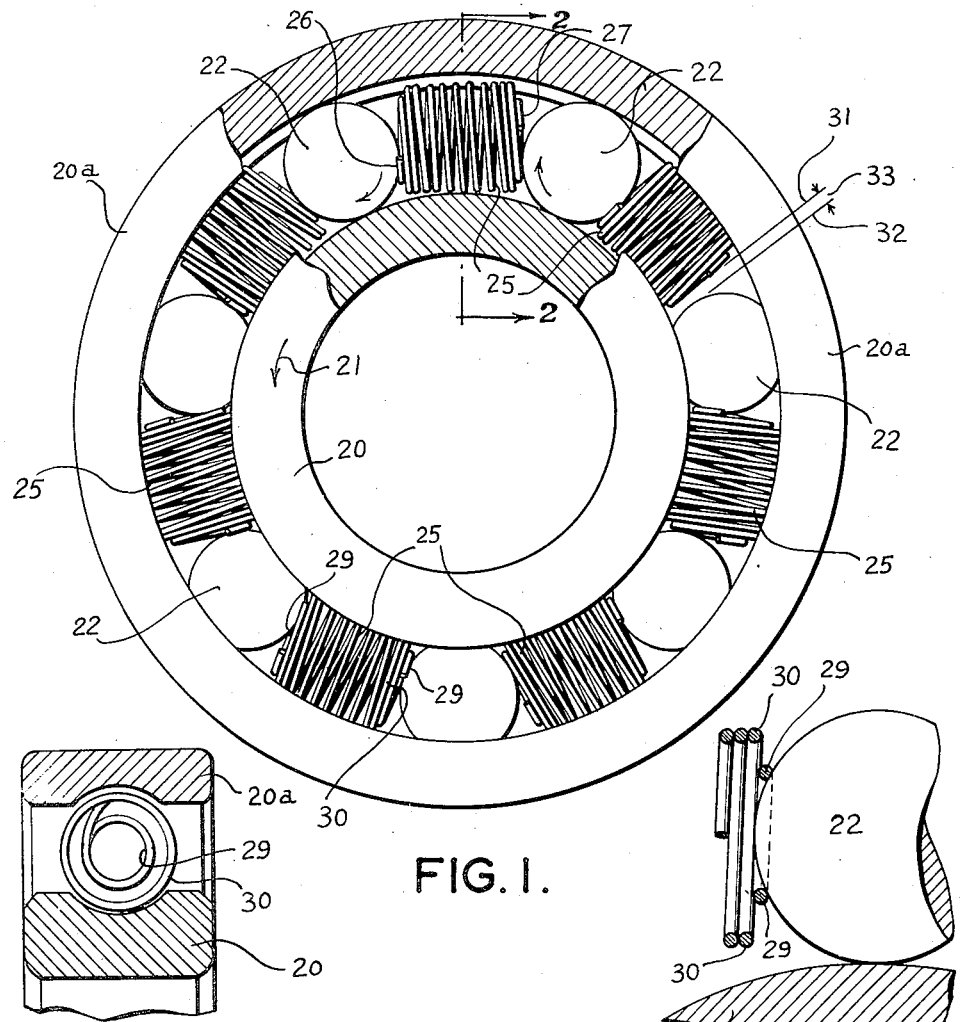
Fig. 1 is a side view of a ball bearing with the improved resilient separators dispersed between the balls, with parts broken away to show balls contacting with the races, the separators being in normal non-stressed condition.
Fig. 2 is a section on line 2—2 of Fig. 1.
Fig. 3 is a sectional view with part of ball and separator broken away, and taken on line 3—3 of Fig. 4.
Fig. 4 is a top view of two balls, broken away in part, and the improved separator therebetween, the separator being of the same type as that shown in Fig. 1, with a part of the separator in non-stressed condition, as in Fig. 1, and with a part under compression.
Fig. 5 is an end view of the separator of Fig. 4.
Fig. 6 is an end view of the separator at its other end.

In order to understand the advantages of a resilient separator it will be necessary to consider the manner in which a ball bearing and associated separators operate. It will be evident that in a bearing having absolutely perfect and symmetrical races and balls of uniform size and the bearings so mounted that the inner and outer races are in absolute alignment, the balls will, under pure thrust loading, all be equally loaded and will all travel at the same velocity, while one race is being rotated with respect to the other. If, however, the races are even slightly imperfect and if there are slight variations in ball size as well as unavoidable misalignment in the mounting of the bearing, the balls will not all travel at the same velocity and consequently over any interval of time there will be a tendency for the balls to change their initial relative separation, and thus one or more of the balls will tend to approach its next adjacent ball. If this action continues until the clearance between the ball and separator has been removed, further rotation of the bearing can only result in a compressional distortion of the separator which will give rise to a system of forces tending to impede further motion of the balls. From an energy standpoint, the potential elastic energy in the distorted separator is furnished by an additional torque applied to the rotating race member. This additional torque causes a binding or sticking action. The above mentioned forces resulting from the distortion of the separator are for a given set of races and balls dependent upon the stiffness of the separator itself and if a spring upon its spring rate. Consequently, if a relatively rigid separator is replaced by one having a definite resiliency or flexibility, it is evident that the forces acting upon the balls will be very much reduced in magnitude and thus the sticking or binding action above mentioned will be materially reduced. As the compressed spring and the two associated balls continue to move around the raceway, one of the balls will reach a position where it is relieved of any load imposed upon it by the raceways, such relief being afforded by slight variations in the raceways themselves or due to slight misalignment between the inner and outer races of the bearing. When the ball reaches such an unloaded position, the action of the spring will tend to restore the ball to its initial separation from the adjacent ball. In a bearing under purely radial loading, a somewhat similar action as described will take place and the spring will be compressed as the balls pass through the loaded zone and then the springs will be relieved of pressure as soon as the balls pass into an unloaded zone.

In resilent separators applied to a bearing it is desirable to eliminate as much as possible the friction between the separators and the various elements of the bearing and this is accomplished by having the resilient separators under little or no initial compression or stress when inserted in the bearing, since such a compression would cause an increased friction between the separators and balls. In order that the separators be definitely positioned in radial directions perpendicular to the axis of the separator, the outside diameter of the separator is made to closely approach the ball diameter so that once the separators are put in place they will be held in position by the inner and outer raceway surfaces. In order that the helical spring separators be as flexible as possible, it will be necessary that the wire of which the spring is formed be as small in diameter as practical. But the use of a small diameter wire formed into a coil of a diameter only slightly less than that of the ball gives rise to a possibility that the end coil of the spring will wedge itself into the region where the ball contacts with the inner raceway. Any such wedging action is of course objectionable, as it introduces an additional restraint to the rotation of the balls in respect to the raceways. Any wedging of the separator between the balls and the inner race may become considerable and may negative the use for which the separator was intended. Another factor is that under certain abnormal conditions of operation the balls may approach each other to a considerable extent so that the spring separators are under quite a definite compression. If the ends of the spring were of a convex nature or even flat there might under some conditions of operation be a tendency for the forces exerted by the balls upon the springs to force the springs from their desired location and position, to a position where the longitudinal axis of the spring approaches a line perpendicular to the line joining the centers of the two adjacent balls. To prevent this possibility, the portions of the spring in contact with the ball are formed concave so that the spring tends to partially nest over or encompass a portion of the ball surface, so as to form a seat or pocket member for the ball, the seat diameter being arranged so as to be substantially smaller than the outside diameter of the spring which acts as a spring guiding member.

Referring to the drawings, Figs. 1 and 2 show the inner race ring 20 which in this case is rotatable in the direction of the arrow 21, and the outer race ring 20a which in this case is stationary.

The balls 22 contact with the inner race 20 and with the outer races 20a. In the embodiment, seven balls are shown, but these can be more or less. Disposed between the balls are helical springs 25 each having free ends 26 and 27. The springs 25 shown in Fig. 1 are in an unstressed condition.

In Fig. 1, two parallel lines 31 and 32 are spaced a distance 33 from each other. This space 33 is an overall space which results when all of the springs are in normal position and in unstressed condition, just contacting with the balls, with the exception of the spring which is spaced from the ball the distance 33. When the bearing is in operation this space 33 is distributed among the springs and balls. As under rotation and under load some of the balls change their spatial relationship from that shown in Fig. 1, some of the balls are brought closer together, and the springs therebetween are compressed. As the distance between any two balls decreases, the spring between two such balls will be compressively distorted, however, due to the inherently resilient and yielding nature of the spring the forces exerted against the balls will be very small. As the two balls and the compressed spring therebetween reach a position where one of the balls is relieved of its load, the spring will tend to reestablish the original spatial separation of the balls, and the spring will take its unstressed condition.

Figures 7, 8, 9:
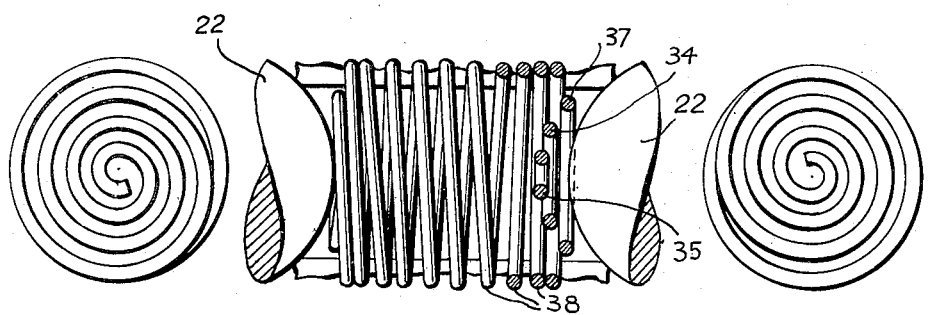
Fig. 7 is a plan view of another embodiment of separator in non-stressed condition.
Fig. 8 is an end view thereof.
Fig. 9 is an end view of the other end thereof.

In the embodiment of the springs shown in the drawings, those of Figs. 1, 2, 3, 4, 5, 6, 10 and 11 are of the same form; and Figures 7 to 9 show a modified form.

Figs. 3, 4, 5 and 6 represent a helical spring 25 having a major outside diameter only slightly less than that of the balls to guide the spring at all times radially and hold it disposed as shown, without possibility of moving into a transverse position. With the springs in unstressed condition a slight clearance with the balls and races is desirable in order to make the action of the springs upon the bearing as free as possible. The end coil 29 at either end of the spring 25 is of substantially reduced diameter in respect to the major outside diameter and is so arranged that each end coil 29 will nest against its adjacent ball when the spring is under compression as shown in Figure 3. The end coil of the spring is definitely placed back from the region where the ball contacts the inner raceway. There is no possibility of the end coil 29 jamming or wedging between the ball 22 and inner racering 20. Furthermore, this nesting action of the end coils against the balls definitely positions and radially centralizes the spring as the two balls approach each other to compress the spring as shown in Fig. 11.

Another embodiment is shown in Figs. 7, 8 and 9, in which the end of each spring has ends so wound as shown in Figs. 8 and 9, to form a pocket formed by several convolutions each of smaller diameter than the outside diameter of the spring. These pocket forming convolutions, 35, 36 and 37, are preferably so formed that when pressed against the ball surface they conform thereto. The convolution of smallest diameter provided at the end of the spring forms the seat 35; the next in larger size forms the seat 34, and the next in larger size forms the seat 37. These are so formed as to form together a seat or concave end pocket for the adjacent ball surface. The major convolutions 38 of the spring separator act to guide the spring in the raceways.

Figures 10, 11:
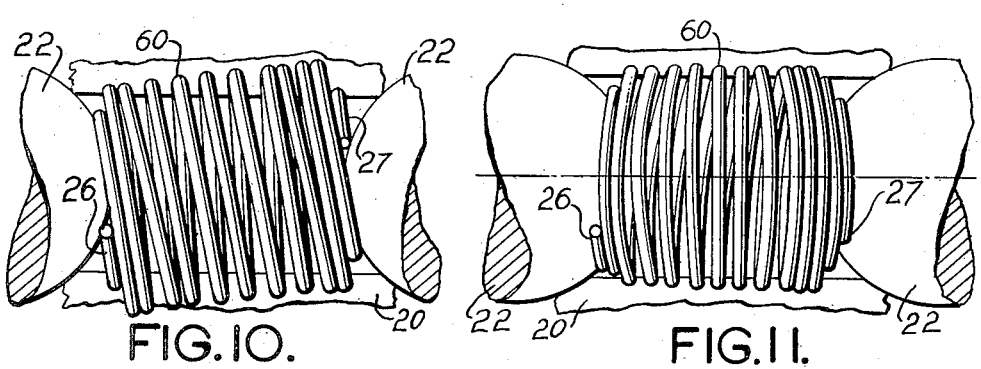
Fig. 10 is a plan view of the form of separator shown in Fig. 1, showing the same in a noncentralized position.
Fig. 11 is a plan view of the same embodiment of separator as shown in Fig. 10 but compressed by the balls and centralized.

In Fig. 10 is shown a plan view of a helical spring 60 of the type shown in Fig. 1, shown in a non-centralized position. Pressure of the balls against the ends of the springs will set up a "force couple" to cause the spring 60 to take the position shown in Fig. 11. In Fig. 11 the spring 60 is centralized.

From the foregoing it will have been noted that there are certain structural features common to all embodiments of the invention. In each case the separator comprises a helical spring. In each case the outside diameters of the spring act as guiding members serving to locate or position the spring in radial directions, that is in directions perpendicular to the longitudinal axis of the spring. In each case the ball seats in an end seating portion of the spring, which end seating portion is of substantially smaller diameter than the largest outside diameter of the spring. By "substantially smaller diameter" is meant a diameter which is smaller by a difference of at least twice the diameter of the wire from which the spring is formed. In all cases these end seating portions of reduced diameters serve to position the spring in an axial direction. In all cases the end seating portion of smaller diameter partially nests over or encompasses the ball surface and thus tends to centralize the spring so that its axis lies in a plane common to the various ball centers.

Tests have shown that the freedom of action in bearings incorporating the improved spring separators is much better than in bearings with the conventional rigid type retainer. There is an entire absence of the intermittent catching and jamming action, which seams characteristic of the rigid type retainer.

In the operation of separators between adjacent balls in delicate instruments certain of the separators are under compression and certain have their ends spaced from the balls. The intermittent placement makes it of importance that the separators properly space themselves when unstressed or under compression, and be free of the objections of those of the prior art.

From the foregoing it is believed that the construction, operation and advantages of my invention may be readily understood by those skilled in the art without further description, it being borne in mind that numerous changes may be made in the details disclosed without departing from the spirit of the invention as set out in the following claim:

What I claim is:

In a ball bearing adapted for low torque when lightly loaded and used at slow speed, having radially spaced inner and outer race rings having race ways and spaced balls circumferentially disposed therebetween, a plurality of separators each adapted to be placed circumferentially between adjacent balls and to move circumferentially with the balls, each comprising a helical wire spring of such a length when axially uncompressed, that the circumferential space necessary for all the springs and balls provides a clearance between at least one of said springs and its adjacent ball and each spring having a body portion externally of cylindrical shape formed of convolutions of uniform external diameter and having its axis in a plane common to the ball centers, the outside diameter of said body portion convolutions being substantially equal to but less than the ball diameter, the outer ends of the body convolutions acting as guiding members freely on the outer raceway, and the inner central portion of the body convolutions acting as a guiding member freely on the inner raceway, said body portion having end convolutions bent radially inwardly and axially outwardly in respect to their next adjacent body convolutions to form a circular nest encompassing the adjacent ball and with the plane of said nest being at right angles to the axis of said body portion, the external diameters of said convolutions forming the nest being smaller by at least twice the diameter of the wire than the external diameter of said body portion, said nest convolutions when pressed by each adjacent ball surface compressing the body convolutions to centralize the separator with its axis in a plane common to the ball centers and substantially concentric with the pitch line of the adjacent balls to avoid pressure of the said guiding members against the raceways.

WARREN D. ANDERSON.